US011165467B1

(12) United States Patent
Garon et al.

(10) Patent No.: US 11,165,467 B1
(45) Date of Patent: Nov. 2, 2021

(54) ANTENNA ARRAYING CAPABLE OF HANDLING VERY HIGH DATA RATES IN REAL TIME

(71) Applicant: United States of America as represented by the Administrator of NASA, Washington, DC (US)

(72) Inventors: Howard Garon, Lanham, MD (US); David Caruth, Arlington, VA (US); Obadiah Kegege, Greenbelt, MD (US); Frank Stocklin, Greenbelt, MD (US); Victor Sank, Lanham, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 17/156,835

(22) Filed: Jan. 25, 2021

Related U.S. Application Data

(60) Provisional application No. 62/967,141, filed on Jan. 29, 2020.

(51) Int. Cl.
*H04B 7/02* (2018.01)
*H04B 7/024* (2017.01)
*H04B 7/08* (2006.01)
*H04B 7/185* (2006.01)

(52) U.S. Cl.
CPC ........... *H04B 7/024* (2013.01); *H04B 7/0854* (2013.01); *H04B 7/0868* (2013.01); *H04B 7/1851* (2013.01); *H04B 7/18523* (2013.01)

(58) Field of Classification Search
CPC .... H04B 7/024; H04B 7/0854; H04B 7/0868; H04B 7/18523; H04B 7/1851
See application file for complete search history.

(56) References Cited

U.S. PATENT DOCUMENTS

| 7,738,538 B1* | 6/2010 | Tung | H04L 27/3872 |
| | | | 375/150 |
| 7,965,798 B2* | 6/2011 | Roh | H04L 25/0216 |
| | | | 375/343 |
| 8,185,074 B2* | 5/2012 | Izumi | H04B 7/084 |
| | | | 455/273 |
| 9,245,579 B2* | 1/2016 | Song | G11B 20/10037 |
| 10,292,104 B2* | 5/2019 | Murali | H04W 52/0216 |

\* cited by examiner

*Primary Examiner* — Jean B Corrielus
(74) *Attorney, Agent, or Firm* — Matthew F. Johnston; Bryan A. Geurts; Helen M. Gaius

(57) ABSTRACT

A high data rate signal combiner (HDRSC), including: a first analog to digital converter (ADC) configured to convert a first radio frequency (RF) signal from a first antenna into a first digital signal; a second ADC configured to convert a second RF signal from a second antenna into a second digital signal; a first circular buffer configured to store the first digital signal from the first ADC; a second circular buffer configured to store the second digital signal from the second ADC; a cross-correlator configured to cross correlate the first digital signal and the second digital signal; a lag peak search circuit configured to determine the location of a peak in the output of the cross-correlator; a vector adder circuit configured to combine the first digital signal and the second digital signal with a delay on one of the first signal and the second digital signal based upon the location of the peak in the output of the cross-correlator; and a digital to analog converter (DAC) configured to convert the combined digital signal into an analog signal.

23 Claims, 3 Drawing Sheets

ANTENNA ARRAYING CAPABLE OF HANDLING VERY HIGH DATA RATES IN REAL TIME

This application claims priority to U.S. Patent Application No. 62/967,141, filed on Jan. 29, 2020, the entire disclosure of which is hereby incorporated for all purposes as if fully set forth herein.

ORIGIN OF THE INVENTION

The invention described herein was made by employees of the United States Government, and may be manufactured and used by or for the Government for Government purposes without the payment of any royalties thereon or therefore.

TECHNICAL FIELD

Example embodiments disclosed herein relate generally to antenna arraying capable of handling very high data rates in real time.

BACKGROUND

Combining the output signals from two or more ground antennas can increase the gain of the received signal, providing the critical flexibility to increase the science data return from space missions. Antenna arraying enables two or more antennas to function as one larger antenna capable of receiving science data at higher data rates than they could individually. Antenna arraying coherently combines radio frequency signals from a group of smaller antennas to produce a signal similar to a single large antenna with more gain. For a number of reasons, building a single larger antenna may be impractical, especially if there are already multiple antennas in close proximity to each other that are available for use.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a high data rate signal combiner (HDRSC), including: a first analog to digital converter (ADC) configured to convert a first radio frequency (RF) signal from a first antenna into a first digital signal; a second ADC configured to convert a second RF signal from a second antenna into a second digital signal; a first circular buffer configured to store the first digital signal from the first ADC; a second circular buffer configured to store the second digital signal from the second ADC; a cross-correlator configured to cross correlate the first digital signal and the second digital signal; a lag peak search circuit configured to determine the location of a peak in the output of the cross-correlator; a vector adder circuit configured to combine the first digital signal and the second digital signal with a delay on one of the first signal and the second digital signal based upon the location of the peak in the output of the cross-correlator; and a digital to analog converter (DAC) configured to convert the combined digital signal into an analog signal.

Various embodiments are described, further including: a first delay circuit configured to receive a first delay indication from the lag peak search circuit, wherein the first delay circuit indicates a location in the first circular buffer to select first digital data input into the vector adder circuit; and a second delay circuit configured to receive a second delay indication from the lag peak search circuit, wherein the second delay circuit indicates a location in the second circular buffer to select second digital data input into the vector adder circuit.

Various embodiments are described, further including an differential Doppler estimator configured to estimate a Doppler differential between the first digital signal and the second digital signal, wherein the delay circuit further comprises a Doppler compensator configured to apply Doppler compensation to the second digital signal based upon the estimated Doppler differential.

Various embodiments are described, wherein estimating the Doppler differential between the first digital signal and the second digital signal is based upon a reduction in peak power of the peak in the output of the cross-correlator and the change in the width of the peak in the output of the cross-correlator.

Various embodiments are described, wherein the delay circuit applies Doppler compensation when the estimated Doppler differential is greater than a predetermined threshold value.

Various embodiments are described, further including: an auto-correlator configured to perform an auto-correlation on the first digital signal; and a peak comparator configured to compare a peak of the auto-correlated first signal to the peak of the output of the cross-correlator, wherein estimating a Doppler differential between the first digital signal and the second digital signal is based upon comparison between the peak of the auto-correlated first signal and the peak of the output of the cross-correlator.

Further various embodiments relate to a method for combining high data rate signals from a first antenna and a second antenna, including: converting a first radio frequency (RF) signal from the first antenna into a first digital signal; converting a second RF signal from a second antenna into a second digital signal; storing the first digital signal in a first circular buffer; storing the second digital signal in a second circular buffer; cross correlating the first digital signal and the second digital signal; determining the location of a peak in the output of the cross-correlator; delaying the first signal based upon the location of the peak in the output of the cross-correlator combining the delayed first digital signal and the second digital signal; and converting the combined digital signal into an analog signal.

Various embodiments are described, wherein cross correlating the first digital signal and the second digital signal includes estimating a Doppler differential between the first digital signal and the second digital signal, and further comprising applying Doppler compensation to the second digital signal based upon the estimated Doppler differential.

Various embodiments are described, wherein estimating the Doppler differential between the first digital signal and the second digital signal is based upon a reduction in peak power of the peak in the output of the cross-correlator and the change in the width of the peak in the output of the cross-correlator.

Various embodiments are described, wherein applying the Doppler compensation includes applying Doppler compensation when the estimated Doppler differential is greater than a predetermined threshold value.

Various embodiments are described, further including: performing an auto-correlation on the first digital signal; and comparing a peak of the auto-correlated first signal to the peak of the output of the cross-correlator, wherein estimating a Doppler differential between the first digital signal and the second digital signal is based upon comparison between the peak of the auto-correlated first signal and the peak of the output of the cross-correlator.

Further various embodiments relate to an antenna arraying system, including: a first antenna; a second antenna; a first downconverter configured to downconvert a signal from the first antenna into a first RF signal; a second downconverter configured to downconvert a signal from the second antenna into a second RF signal; and a high data rate signal combiner (HDRSC) including: a first analog to digital converter (ADC) configured to convert the first radio frequency (RF) signal into a first digital signal; a second ADC configured to convert the second RF signal into a second digital signal; a first circular buffer configured to store the first digital signal from the first ADC; a second circular buffer configured to store the second digital signal from the second ADC; a cross-correlator configured to cross correlate the first digital signal and the second digital signal; a lag peak search circuit configured to determine the location of a peak in the output of the cross-correlator; a vector adder circuit configured to combine the first digital signal and the second digital signal with a delay on one of the first signal and the second digital signal based upon the location of the peak in the output of the cross-correlator; and a digital to analog converter (DAC) configured to convert the combined digital signal into an analog signal.

Various embodiments are described, further including: a high data rate receiver configured to receiver the analog signal output from the DAC.

Various embodiments are described, wherein the HDRSC further includes: a first delay circuit configured to receive a first delay indication from the lag peak search circuit, wherein the first delay circuit indicates a location in the first circular buffer to select first digital data input into the vector adder circuit; and a second delay circuit configured to receive a second delay indication from the lag peak search circuit, wherein the second delay circuit indicates a location in the second circular buffer to select second digital data input into the vector adder circuit.

Various embodiments are described, further including an differential Doppler estimator configured to estimate a Doppler differential between the first digital signal and the second digital signal, wherein the delay circuit further comprises a Doppler compensator configured to apply Doppler compensation to the second digital signal based upon the estimated Doppler differential.

Various embodiments are described, wherein estimating the Doppler differential between the first digital signal and the second digital signal is based upon a reduction in peak power of the peak in the output of the cross-correlator and the change in the width of the peak in the output of the cross-correlator.

Various embodiments are described, wherein the delay circuit applies Doppler compensation when the estimated Doppler differential is greater than a predetermined threshold value.

Various embodiments are described, further including: an auto-correlator configured to perform an auto-correlation on the first digital signal; and a peak comparator configured to compare a peak of the auto-correlated first signal to the peak of the output of the cross-correlator, wherein estimating a Doppler differential between the first digital signal and the second digital signal is based upon comparison between the peak of the auto-correlated first signal and the peak of the output of the cross-correlator.

Various embodiments are described, wherein the first antenna and the second antenna receive a signal from a satellite that is downconverted into the first RF signal and the second RF signal.

Various embodiments are described, wherein the first antenna and the second antenna are separated by up to 5 km.

Various embodiments are described, wherein the first antenna and the second antenna are separated by up to 10 km.

Various embodiments are described, wherein the communication data rate is 600 megabits per second or greater.

Various embodiments are described, wherein the communication data rate is 1.2 giga-symbols per second or greater.

BRIEF DESCRIPTION OF THE DRAWINGS

Additional objects and features of the invent-ion will be more readily apparent from the following detailed description and appended claims when taken in conjunction with the drawings. Although several example embodiments are illustrated and described, like reference numerals identify like parts in each of the figures, in which:

To facilitate understanding, identical reference numerals have been used to designate elements having substantially the same or similar structure and/or substantially the same or similar function.

DETAILED DESCRIPTION

Figure 1:
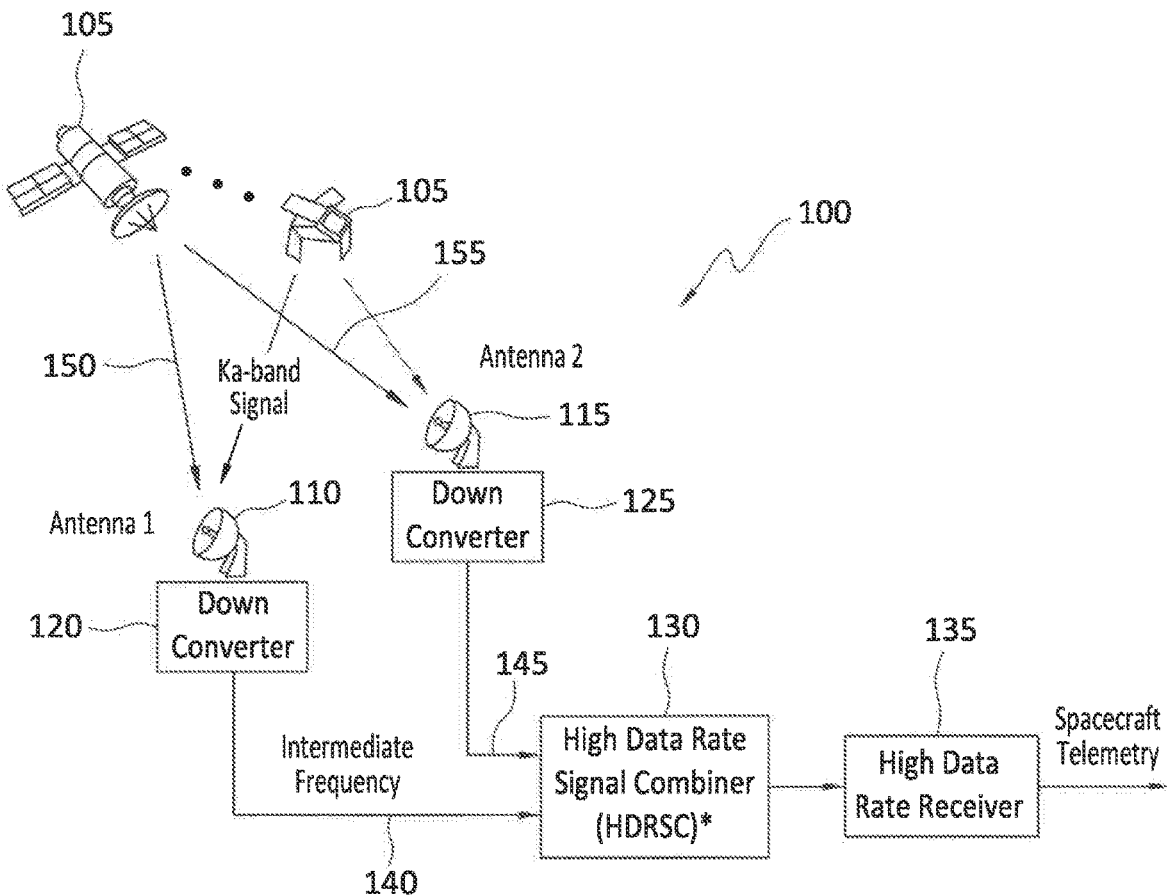
FIG. 1 illustrates an overview of an antenna arraying system.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

Combining the output signals from two or more ground antennas can increase the gain of the received signal, providing the critical flexibility to increase the science data return from space missions. NASA's Near Earth Network (NEN) has developed gigabits/sec high rate antenna arraying system, based on the coherent combination of signals derived from multiple directive antennas. This arraying system includes a High Data Rate Signal Combiner (HDRSC). This arraying of antennas approach/technology has been used at very low data rates. However, embodiments described herein focus on gigabits/sec high rate antenna arraying system architecture. When coherently combining just two signals there is ideally a doubling of power, i.e., a 3 dB signal-to-noise improvement. Arraying of small antennas can easily outperform a single large aperture antenna not only in radio-frequency performance but also in a substantial reduction of cost.

With ever increasing scientific payloads, NASA is forced to continue its effort to improve its signal handling capability in the face of physical adversity. If all other variables are kept constant, every doubling of the data rate results in a 3 dB degradation of the signal to noise. The new spacecraft destined to be launched over the next several years will begin to tax NASA's ground support system currently in place. The HDRSC represents a key effort for meeting NASA's near-future new requirements. Further improvements in the technology should provide a vehicle for NASA to meet its signal handling requirements through the next decade.

NASA's Near Earth Network (NEN) has been developing Ka-band high-rate antenna arraying, which enables two or more NEN antennas to function as one larger antenna capable of receiving science data at higher data rates than they could individually. Antenna arraying coherently combines radio frequency signals from a group of smaller antennas to produce a signal similar to a single large antenna with more gain. For a number of reasons, building a single larger antenna may be impractical, especially if NEN already has multiple resources in close proximity to each other. Applying this technology to assets already in place will enable the NEN to support the missions with higher data demands sooner rather than later. The preliminary NEN antenna arraying analyses were focused on solving the problem of daily data downlink/volume and coverage needed to meet the requirements of the Wide Field Infrared Telescope (WFIRST) mission which includes a daily volume of 11.5 Terabits (Tbit) of data. Working with WFIRST, NEN developed a Near Earth Network (NEN) based 18-m antenna solution with an arraying concept to increase the data rate transmitted from WFIRST without impacting the Radio Frequency (RF) design of the spacecraft itself. In addition, the recommendation incorporated multiple data rates for the WFIRST mission to accommodate the atmospheric attenuation variation during any given pass. This strategy of arraying two 18 m antennas allowed the NEN to provide well in excess of the 11.5 Tbit/day data volume requirement. To achieve this, two ground terminals are required—one in the northern hemisphere and the other one in the southern hemisphere to account for the earth's rotation, seasonal tilt and the Halo orbit of WFIRST around the earth/sun L2 liberation point. A number of ground station locations were studied and the recommended locations were White Sands, N. Mex. (WSC) and South Africa (SA). The resulting coverage exceeds an aggregate of 18 hours/day. Having a minimal arraying capability at 600 Mbit/s then increases the daily volume captured to ~30 Tbits per day.

Figure 2:
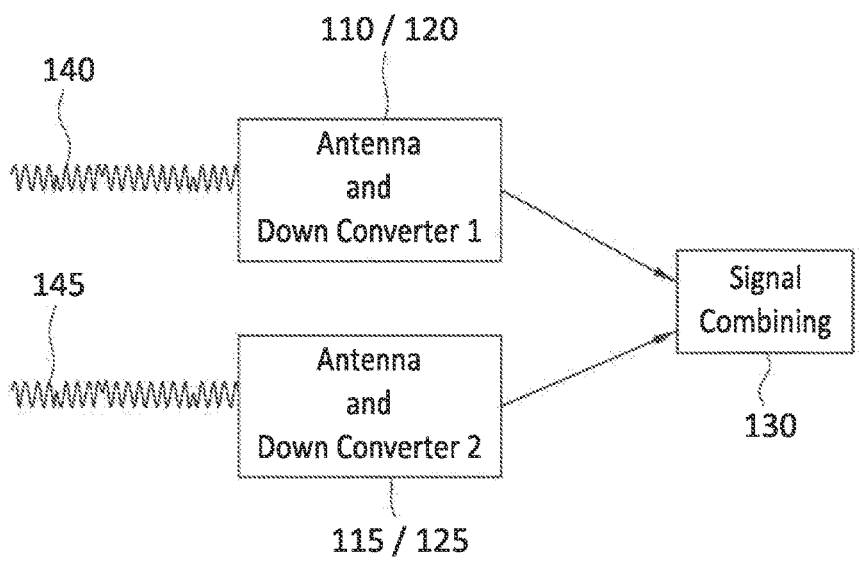
FIG. 2 illustrates the time difference between the signals received by the two different antennas.

FIG. 1 illustrates an overview of an antenna arraying system 100. The antenna arraying system 100 may include a satellite 105, a first antenna 110, a second antenna 115, a first downconverter 120, a second downconverter 125, a high data rate signal combiner (HDRSC) 130, and a high data rate receiver 135. When the satellite 105 transmits data to the first antenna 110 and the second antenna 115. Each antenna has a downconverter 120, 125 that amplifies the signal received by the antenna and downconverts the signal to an intermediate frequency. FIG. 2 illustrates the time difference between the signals received by the two different antennas 110, 115 because the satellite has a slightly different distance to each of the antennas 110, 115. The first antenna 110 and downconverter 120 receive a first RF signal 150. The second antenna 115 and downconverter 120 receive a second RF signal 155. In FIG. 2, it is illustrated that the second antenna 115 and downconverter 120 are farther from the satellite 105 and hence the second signal 155 is delayed compared to the first signal 150 received by the first antenna 110 and downconverter 120. If these received signals were combined as received, the phase difference between them would lead to a less than ideal coherent combination of the two signals. Hence, this time difference of arrival needs to be compensated so that the two received signals 150 and 155 are time aligned when combined to provide a coherent combination of the signals.

The HDRSC 130 receives the downconverted signals 140 and 145, digitizes them, time aligns them, combines them, and the converts the combined signal back to an analog signal for further processing by the high data rate receiver 135. The high data rate receiver 135 demodulates the received signal into digital data collected and transmitted by the satellite 105.

While NASA has experimented with antenna arraying since the 1980s, arraying hardware described herein surpasses the data rate capabilities of previous arraying technologies. The HDRSC 130 employs the latest cutting edge silicon technologies to calculate the time delay between signals of spatially disparate antennas. After first converting the incoming signals to the digital domain, the HDRSC 130 determines the time difference between the antenna arrivals. Knowing the time delay to within utmost accuracy, the HDRSC 130 while still in the digital domain, adds the received signals together. The resulting coherently combined signal is then converted back to the analog domain. Updates to the time difference estimates are accomplished on the order of milliseconds so the whole process may be completed in real time during a spacecraft pass. Without these real time calculations, the signals, and therefore the data, would be unintelligible.

As NASA's Artemis missions move toward a planned lunar landing in 2024, improving communications between spacecraft and ground has become even more important. Other missions are driving the need for improved high speed communication with satellites to facilitate bringing gigabits per second (Gbps) of data back to Earth to expand discovery capabilities. Data requirements continue to grow as advanced science instruments are developed and deployed on NASA missions. Ground antennas and systems need increased capacity and capability to capture the immense amount of data coming from these missions.

The design goal for the arrayed antenna system was the capability to perform arraying between a pair of antennas at 600 Mbit/s with the antennas separated by up to 5 km. A prototype design was developed with the capability to array signals up to ~1.2 Gsymbols per second (Gsps) with physical spacing up to 10 km between the antennas. The design is scalable and allows arraying up to eight antennas.

Figure 3:
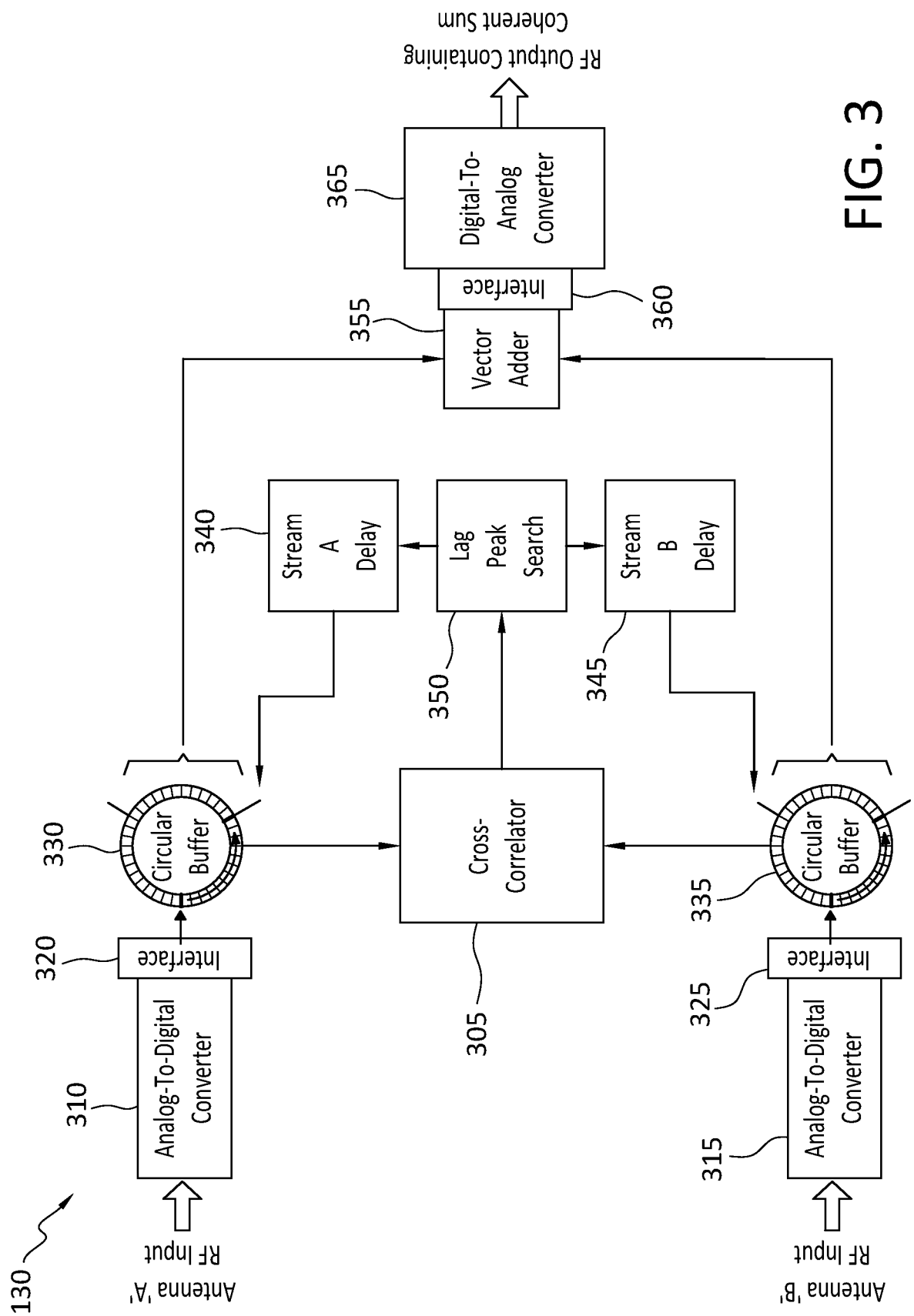
FIG. 3 illustrates an embodiment of the high data rate signal combiner.

FIG. 3 illustrates an embodiment of the HDRSC. The HDRSC 130 may include analog to digital converters (ADC) 310, 315, circular buffers 330, 335, a cross-correlator 305, a lag peak search circuit 350, a stream A delay circuit 340, a stream B delay circuit 345, a vector adder 355, interfaces 320, 325, 360, and a digital to analog converter (DAC) 365. The underlying operational foundation of the HDRSC 130 is an extremely efficient and tightly-constructed cross-correlator 305. Referring to FIG. 3, two analog radio-frequency (RF) signals 140, 145 are presented on the inputs to the HDRSC 130. Each RF signal 140, 145 represents the output of a spatially disparate antenna 110, 115 prior to any signal processing beyond down-conversion, which is carried out by the downconverters 120, 125. Each analog RF signal 140, 145 is converted to a digital signal using an ADC 310, 315, and the respective outputs of the ADCs 310, 315 are stored within a respective circular memory buffer 330, 335. The pair of circular memory buffers 330, 335 are then simultaneously accessed to produce one digital stream from each circular buffer 330, 335 which are directed to the cross-correlator 305 for processing. For the classes of modulated and encoded signals that are ordinarily employed in practice, the cross-correlator output will contain a sharply defined spectral peak. The more complicated the signal as modulated and emitted by the original signal source, the more sharply defined will be the peak. The location of the peak within the cross-correlator output spectrum dictates the time-delay or signal lag between the pair of signals. The output of the cross-correlator 305 is feed into a lag peak search circuit 350. This lag peak search circuit 350 simply identifies the location of the peak of the output of the cross-correlator 305. This peak is indicative of the time offset between the two input RF signals 140, 145. This peak value is then used to indicate a delay for reading out data from the circular buffer containing data for the RF signal that was first received. This may be done using the appropriate stream delay circuits 340, 345.

The vector adder circuit 355 coherently combines the two digitized RF signals. The vector adder circuit 355 receives data from the circular buffers 330, 335. The data is read from the circular buffers 330, 335 using the delay indicated by the stream delay circuits 340, 345. This results in the data streams being time aligned because of the information obtained from the search of the cross-correlator spectral output for the peak determines precisely where in the respective circular buffers the digital data streams used for the vector adder are derived. With this proper time offset obtained and applied between the signals, the signals are digitally combined in the vector adder circuit 355 to form a single digital signal output stream. That combined digital stream is converted back into the analog domain using a digital-to-analog converter 365.

This algorithm described above belongs to a class of signal processing often referred to under the "pre-detection" property. The advantages of this approach are multiple. The only analog signal pre-processing that may be required at the antenna is down-conversion from the original source carrier frequency to an intermediate frequency (IF) to facilitate handling and minimize signal loss. The spatially-separated antennas are not required to be identical, nor are the antenna signals as presented at the input to the HDRSC required to be of the same power magnitude. The overall problem is instead dictated by the properties of the cross-correlator in that the primary error is driven by phase differentials in the time-domain and dispersion in the frequency-domain (e.g., Doppler). As with most correlation-type algorithms, the HDRSC 130 may detect the cross-correlation peak even if the source signal is buried in the noise. Whether the signal is subsequently detected by further processing in a conventional RF receiver is determined by how much gain is derived from the signal combiner and the characteristics of the receiver for the given modulation and encoder scheme.

A hardware implementation of the HDRSC 130 was first realized in order to demonstrate the viability of the antenna array system concept. The conversion from the analog to digital domain is accomplished using a pair of Analog Devices AD9208 ADC while the inverse employs an Analog Devices AD9271 DAC. At the heart of the realization is the Xilinx VU190 Ultrascale Field Programmable Gate Array (FPGA). This FPGA allows the construction of a cross-correlator that is composed of multiple simultaneously-executing Fast Fourier Transforms (FFTs), all governed by a single clock. The current realization employs a 2 Giga-samples per second (GSamples/s) sampling clock, completes a 64 kilo-point transform at 80 repetitions per second resulting in a maximum update latency across the entire algorithm of under 40 ms. In terms of the physical parameters associated with the dynamics of spacecraft, this meets the rigid response times required for both acquisition of signal (AOS) and for retaining the signal during loss of signal (LOS. Key to minimizing power dissipation and meeting the demanding input and output requirements in both the analog and digital domains, the ADCs and DAC employ the JESD-204B serial digital data stream protocol. While the JESD-204B protocol is used in the present realization, this may be extended to both the inputs and output to other protocols employed in high speed digital data signaling.

This coherent signal combiner approach also offers a fail-safe should one antenna fail, for any reason, on input to the HDRSC. The output of the HDRSC automatically reverts to whatever channel still has an active signal on input although any anticipated gain would be lost. Regardless of the latency between the two signal inputs, the HDRSC will almost immediately recover (<40 ins) once the two antenna signals are restored to the HDRSC inputs.

The HDRSC design is open to scaling because the embedded algorithm relies upon the use of the Fourier Transform (FT) and is therefore linear. While the initial HDRSC implementation was directed at arraying two antennas, N antennas may be assigned N forward FTs and N−1 inverse FTs. In other words, the system is only limited by available silicon resources. If all antennas produce similar (in amplitude) inputs to the HDRSC, then the resulting coherent combination will result in an overall gain that approaches 10logN.

With a 2GSamples/s sampling clock and an IF of 2.4 GHz, the HDRSC as presently configured may handle signal modulation data rates up to 800 Mega-symbols per second (Msps) given a maximum antenna separation of 5 kilometers (km). With a 3GSamples/s clock, the unit could be modified to handle data rates up to 1.2 Gsps in conjunction with an antenna separation on the order of 10 km. The system is fully automatic and is both digital modulation mode agnostic and spread spectrum agnostic. The HDRSC only requires an operator to point the antenna at the signal source.

The signals received by the antennas at different locations may result in different Doppler effects on the received signals, and the Doppler effect may become the major physical limitation towards optimizing the coherent sum of all received signals. As the Doppler differential increases between any pair of received signals, the gain resulting from a simple coherent sum of the signal pair reduces. In order to overcome this limitation, the customary solution is to first apply a Doppler correction to each incoming received signal prior to summation. However, the customary solution is known to have multiple disadvantages including the following. The customary solution requires a priori knowledge of the moving source dynamics (path and velocity vectors). Full Doppler correction, as opposed to a differential Doppler correction, must be applied to every received signal. Increasing Doppler magnitude then corresponds to increasing correction errors and added distortion. The full Doppler correction can increase in magnitude with increasing source frequency and become especially difficult to manage arithmetically. The differential Doppler magnitude, on the other hand, is driven by frequency and moderated by the physical separation between receive antennas. In practice, this physical separation between receive antennas will result in arithmetically-tractable differential magnitudes, especially when compared to handling the full Doppler magnitude.

Figure 4:
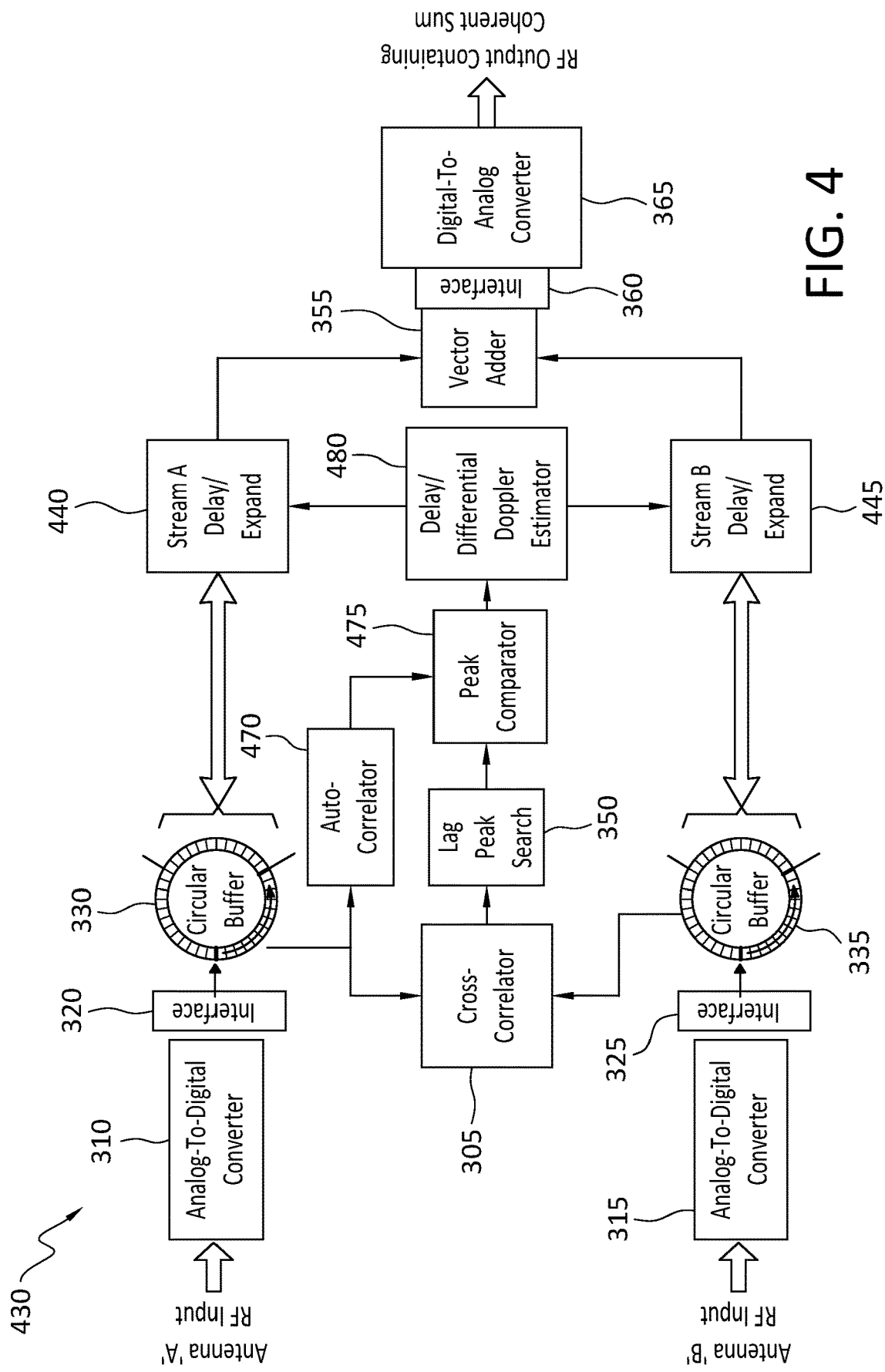
FIG. 4 illustrates another embodiment of the HDRSC that compensates for Doppler shifts of the received signal.

A method for compensating for Doppler shifts is now described. Rather than apply a full Doppler correction to every received signal, the new method declares one of the incoming signals, without any further modification, as the reference. For all other received signals, the cross-correlation of each received signal with respect to the reference received signal is then computed. FIG. 4 illustrates another embodiment of the HDRSC that compensates for Doppler shifts of the received signal. In FIG. 4 many of the items are the same as in FIG. 3 and include the same reference number. These same items are a described above with respect to FIG. 3. The auto-correlation of the reference signal is computed by an auto-correlator 470. This is equivalent to building a baseline cross-correlation peak between a pair of (identical) signals with zero differential Doppler. The basic characteristics of each cross-correlation peak are then compared by the peak comparator 475 with the zero differential-Doppler baseline in order to derive an estimate of the actual differential Doppler magnitude between the reference incoming signal and the other received signal. The Doppler estimate may be estimated by the delay/differential Doppler estimator. This may be done in a number of ways but the most straightforward consists of a lookup table relating the reduction in peak power and the 3 dB bandwidth in terms of lags of the cross-correlation peak.

Only the estimated differential Doppler correction is applied to all the received signals except the reference. The Doppler correction is applied along with the delay by the stream A delay/expand circuit 440 and the stream B delay/expand circuit. At times the magnitude of the differential Doppler can be quite small over the entire received spectra. In those instances a differential Doppler magnitude threshold may be defined. If an estimate for the differential Doppler magnitude is below the minimum threshold then the correction is not applied to the received signal spectrum by the delay/expand circuits 440, 445.

Between the referenced received signal and any other received signal, the lag at which the cross-correlation peak occurs will remain relatively invariant. There can be some jitter (wander) in the peak but a history of peak lags and curve-fitting can reduce the wander dramatically. The history-corrected peak lag can then be used in establishing the delay that is required in adding the received data streams coherently in the time domain.

Lab demonstration of the HDRSC successfully showed the robustness of the system. The HDRSC system automatically detects the delay between the antenna channels and coherently adds the signals to achieve almost a 3 dB gain over a single antenna (two channels), hence increasing data rates.

Any combination of specific software running on a processor to implement the embodiments of the invention, constitute a specific dedicated machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A high data rate signal combiner (HDRSC), comprising:
    a first analog to digital converter (ADC) configured to convert a first radio frequency (RF) signal from a first antenna into a first digital signal;
    a second ADC configured to convert a second RF signal from a second antenna into a second digital signal;
    a first circular buffer configured to store the first digital signal from the first ADC;
    a second circular buffer configured to store the second digital signal from the second ADC;
    a cross-correlator coupled to said first circular buffer, and said second circular buffer, the cross-correlator configured to cross correlate the first digital signal received from the respective first circular buffer and the second digital signal;
    a lag peak search circuit configured to determine a location of a peak in an output of the cross-correlator;
    a vector adder circuit coupled to the first circular buffer and the second circular buffer and configured to combine the first digital signal and the second digital signal with a delay on one of the first digital signal and the second digital signal based upon the location of the peak in the output of the cross-correlator to produce a combined digital signal; and
    a digital to analog converter (DAC) configured to convert the combined digital signal into an analog signal.

2. The HDRSC of claim 1, further comprising:
    a first delay circuit configured to receive a first delay indication from the lag peak search circuit, wherein the first delay circuit indicates a location in the first circular buffer to select first digital data input into the vector adder circuit; and
    a second delay circuit configured to receive a second delay indication from the lag peak search circuit, wherein the second delay circuit indicates a location in the second circular buffer to select second digital data input into the vector adder circuit.

3. The HDRSC of claim 1, further comprising a differential Doppler estimator configured to estimate a Doppler differential between the first digital signal and the second digital signal,
    wherein a delay circuit further comprises a Doppler compensator configured to apply Doppler compensation to the second digital signal based upon the estimated Doppler differential.

4. The HDRSC of claim 3, wherein estimating the Doppler differential between the first digital signal and the second digital signal is based upon a reduction in peak power of the peak in the output of the cross-correlator and a change in a width of the peak in the output of the cross-correlator.

5. The HDRSC of claim 4, wherein the delay circuit applies said Doppler compensation when the estimated Doppler differential is greater than a predetermined threshold value.

6. The HDRSC of claim 3, further comprising:
an auto-correlator coupled to the first circular buffer and configured to perform an auto-correlation on the first digital signal to produce an auto-correlated first digital signal; and
a peak comparator configured for compare a peak of the auto-correlated first digital signal to the peak of the output of the cross-correlator,
wherein estimating a Doppler differential between the first digital signal and the second digital signal is based upon comparison between the peak of the auto-correlated first digital signal and the peak of the output of the cross-correlator.

7. A method for combining high data rate signals from a first antenna and a second antenna, comprising:
converting a first radio frequency (RF) signal from the first antenna into a first digital signal;
converting a second RF signal from the second antenna into a second digital signal;
storing the first digital signal in a first circular buffer;
storing the second digital signal in a second circular buffer;
cross correlating the first digital signal from the first circular buffer and the second digital signal from the second circular buffer using a cross-correlator;
determining a location of a peak in an output of the cross-correlator;
delaying the first digital signal from the first circular buffer based upon the location of the peak in the output of the cross-correlator;
combining the delayed first digital signal and the second digital signal from the second circular buffer to produce a combined digital signal; and
converting the combined digital signal into an analog signal.

8. The method of claim 7, wherein cross correlating the first digital signal and the second digital signal includes estimating a Doppler differential between the first digital signal and the second digital signal, and further comprising applying Doppler compensation to the second digital signal based upon the estimated Doppler differential.

9. The method of claim 8, wherein estimating the Aid Doppler differential between the first digital signal and the second digital signal is based upon a reduction in peak power of the peak in the output of the cross-correlator and a change in a width of the peak in the output of the cross-correlator.

10. The method of claim 9, wherein applying the Doppler compensation includes applying Doppler compensation when the estimated Doppler differential is greater than a predetermined threshold value.

11. The method of claim 8, further comprising:
performing an auto-correlation on the first digital signal from the first circular buffer; and
comparing a peak of the auto-correlated first digital signal to the peak of the output of the cross-correlator,
wherein estimating a Doppler differential between the first digital signal and the second digital signal is based upon comparison between the peak of the auto-correlated first digital signal and the peak of the output of the cross-correlator.

12. An antenna arraying system, comprising:
a first antenna;
a second antenna;
a first downconverter configured to downconvert a signal from the first antenna into a first radio Frequency (RF) signal;
a second downconverter configured to downconvert a signal from the second antenna into a second RF signal; and
a high data rate signal combiner (HDRSC) comprising:
a first analog to digital converter (ADC) configured to convert the first radio frequency (RF) signal into a first digital signal;
a second ADC configured to convert the second RF signal into a second digital signal;
a first circular buffer configured to store the first digital signal from the first ADC;
a second circular buffer configured to store the second digital signal from the second ADC;
a cross-correlator configured to cross correlate the first digital signal and the second digital signal;
a lag peak search circuit configured to determine a location of a peak in an output of the cross-correlator;
a vector adder circuit coupled to the first circular buffer and the second circular buffer and configured to combine the first digital signal and the second digital signal with a delay on one of the first digital signal and the second digital signal based upon the location of the peak in the output of the cross-correlator to produce a combined digital signal; and
a digital to analog converter (DAC) configured to convert the combined digital signal into an analog signal.

13. The antenna arraying system of claim 12, further comprising:
a high data rate receiver configured to receive the analog signal output from the DAC.

14. The antenna arraying system of claim 12, wherein the HDRSC further comprises:
a first delay circuit configured to receive a first delay indication from the lag peak search circuit, wherein the first delay circuit indicates a location in the first circular buffer to select first digital data input into the vector adder circuit; and
a second delay circuit configured to receive a second delay indication from the lag peak search circuit, wherein the second delay circuit indicates a location in the second circular buffer to select second digital data input into the vector adder circuit.

15. The antenna arraying system of claim 12 further comprising a differential Doppler estimator configured to estimate a Doppler differential between the first digital signal and the second digital signal,
wherein a delay circuit further comprises a Doppler compensator configured to apply Doppler compensation to the second digital signal based upon the estimated Doppler differential.

16. The antenna arraying system of claim 15, wherein estimating the Doppler differential between the first digital signal and the second digital signal is based upon a reduction in peak power of the peak in the output of the cross-correlator and a change in a width of the peak in the output of the cross-correlator.

17. The antenna arraying system of claim 16, wherein the delay circuit applies said Doppler compensation when the estimated Doppler differential is greater than a predetermined threshold value.

18. The antenna arraying system of claim 15, further comprising:
- an auto-correlator coupled to the first circular buffer and configured to perform an auto-correlation on the first digital signal to produce an auto correlated first digital signal; and
- a peak comparator configured for compare a peak of the auto-correlated first digital signal to the peak of the output of the cross-correlator,
- wherein estimating a Doppler differential between the first digital signal and the second digital signal is based upon comparison between the peak of the auto-correlated first digital signal and the peak of the output of the cross-correlator.

19. The antenna arraying system of claim 12, wherein the first antenna and the second antenna receive a signal from a satellite that is downconverted into the first RF signal and the second RF signal.

20. The antenna arraying system of claim 12, wherein the first antenna and the second antenna are separated by up to 5 kilometers.

21. The antenna arraying system of claim 12, wherein the first antenna and the second antenna are separated by up to 10 kilometers.

22. The antenna arraying system of claim 12, wherein a communication data rate is 600 megabits per second or greater.

23. The antenna arraying system of claim 12, wherein a communication data rate is 1.2 giga-symbols per second or greater.

* * * * *